Jan. 30, 1945.  A. W. BRUCE  2,368,590
RAILWAY VEHICLE
Filed May 26, 1943  2 Sheets-Sheet 1
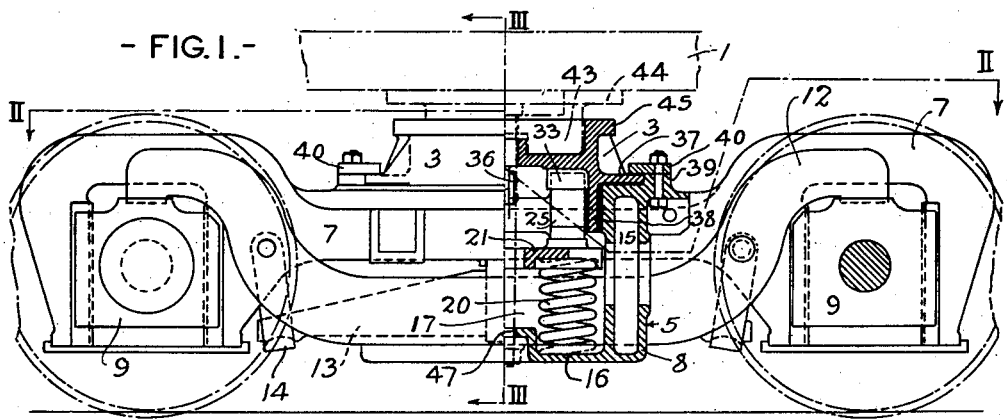
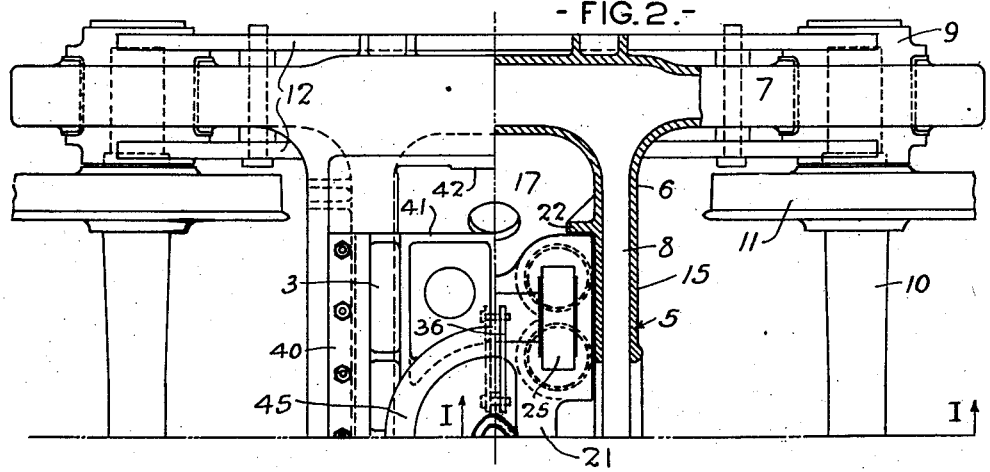
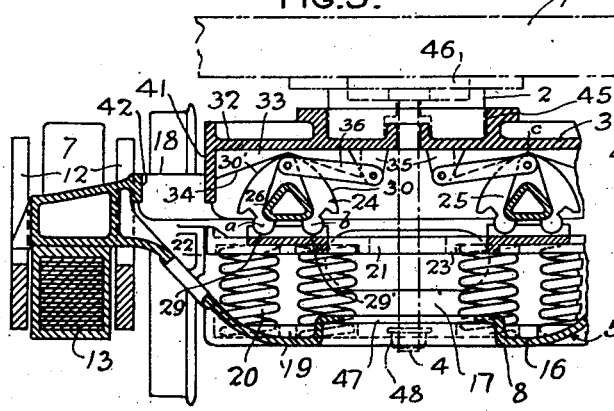 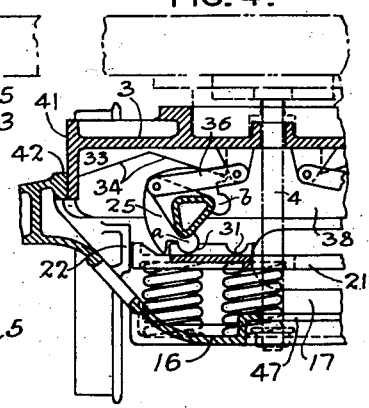
INVENTOR
*Alfred W. Bruce*
BY *S. O. Yeaton*
ATTORNEY Jan. 30. 1945.      A. W. BRUCE      2,368,590
RAILWAY VEHICLE
Filed May 26, 1943      2 Sheets-Sheet 2
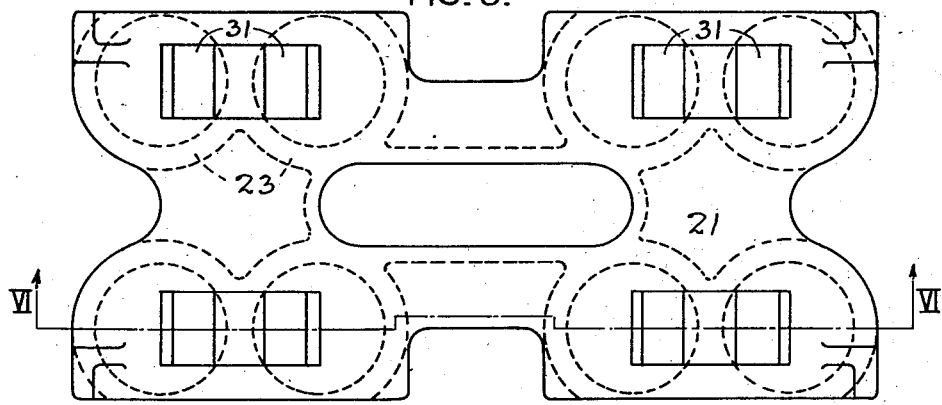
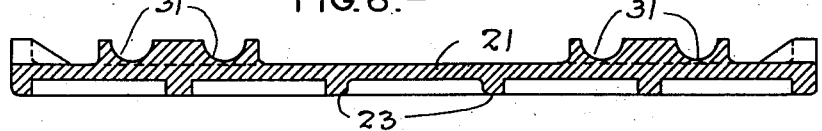
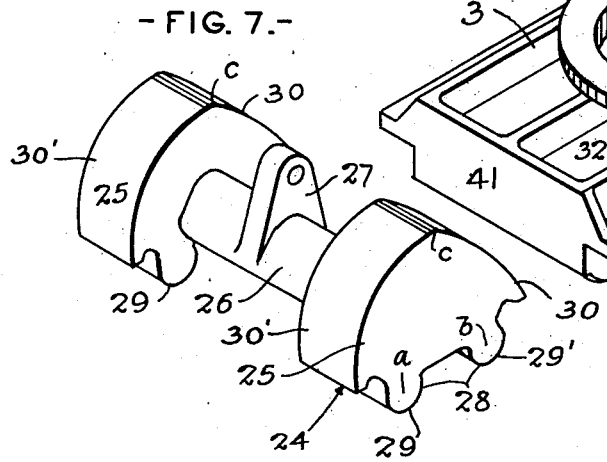
INVENTOR
Alfred W. Bruce
BY *S. C. Yeaton*
ATTORNEY Patented Jan. 30, 1945

2,368,590

UNITED STATES PATENT OFFICE 2,368,590

RAILWAY VEHICLE

Alfred W. Bruce, New York, N. Y., assignor to American Locomotive Company, New York, N. Y., a corporation of New York Application May 26, 1943, Serial No. 488,542

1 Claim. (Cl. 105—189)

This invention relates to railway vehicles and more particularly to lateral motion resistance and centering devices therefor.

An object of the present invention is to provide a lateral motion resistance and centering device for a railway vehicle simple and compact in construction, mechanically sure and positive in operation, and low in maintenance.

A further object is to provide a device as aforesaid which operates against the downward pressure thereupon of the vehicle superstructure, the device including spring means providing a yielding characteristic preventing the superstructure from being lifted during the operation of the device, but exerting an advantageous upward force on the superstructure during the relative lateral movements between the superstructure and truck from and to their normal centralized position.

Other and further objects of this invention will appear from the following description, the accompanying drawings and the appended claim.

Referring to the drawings forming a part of this application, Figure 1 is, at the left, a side elevation, and at the right, a section on the line I—I of Fig. 2, of a portion of a railway vehicle, including a truck and a portion of the vehicle superstructure, parts being indicated in dot-dash lines; Fig. 2 is a section on the line II—II of Fig. 1, parts being shown in full and parts being omitted; Fig. 3 is a section on the line III—III of Fig. 1, parts being shown in full and parts being broken away; Fig. 4 is a view similar to Fig. 3 showing a lateral motion position between the truck and center plate, only a portion of the structure of Fig. 3 being shown; Fig. 5 is a plan view of the spring plate; Fig. 6 is a section on the line VI—VI of Fig. 5; Fig. 7 is an isometric view of a rocker; and Fig. 8 is an isometric view of a center plate.

It is common practice to equip railway cars and locomotives with lateral motion resistance and centering devices. These devices are disposed at various positions. In the case of locomotives, for instance, the device is sometimes disposed between the trailing truck and the superstructure, and sometimes between the leading truck and superstructure.

The truck and superstructure are designed to have relative lateral movement from and to normal centralized position, and the device is constructed to offer resistance to the relative movement from, and to afford assistance to the relative movement to, the normal centralized position. This is particularly advantageous in passing from tangent to and through curved track and back to tangent track. The device also acts to steady the truck and superstructure, helping to maintain their centralized position when running on tangent track.

A common type of railway vehicle comprises a superstructure having an underframe provided with a center pin and a center plate for connection with a truck, as for instance the leading truck of a locomotive, permitting the truck to turn relative to the underframe. While the lateral motion resistance and centering device of the present invention is not limited to any particular location, it is of special application to the center pin-center plate type of vehicle, and for the purpose of illustration it is designed in the present instance for such application and is shown in connection with a four-wheel leading truck.

The truck, except as modified for its adaptation to the present invention, is conventional, and therefore, to this extent, it will be briefly described, and for convenience of description the center pin, center plate and connecting bolt will be considered as part of the superstructure.

In Fig. 2 only the portion of the truck and associated parts at one side of the longitudinal center line is shown, but it will be understood that the portion of the truck and associated parts on the other side of the longitudinal center line are similar. The only parts of the superstructure shown, referring to the figures generally, are the underframe 1, shown fragmentally, the center pin 2, the center plate 3, and the connecting bolt 4. Except for the center plate, these parts are shown in dot and dash lines.

The truck is of the four-wheel outside journal type and is indicated generally by the reference numeral 5. It comprises an integral frame 6 having side members 7 and a bolster 8. The side members are hollow and are provided at their ends with pedestal jaws for journal boxes 9. The truck further comprises axles 10 having journals housed in the journal boxes, wheels 11, equalizers 12 supported at their ends upon the journal boxes, and leaf springs 13 supporting the side members and supported by the equalizers by means of hangers 14.

The bolster 8 comprises spaced hollow cross members 15 extending transversely of the truck and connecting the side members 7, their hollow interiors communicating with the hollow interiors of the side members. The bolster further comprises a bottom plate or wall providing a spring seat 16. This plate connects the cross members 15 and the side members 7 providing therewith a chamber 17 open at the top as at 18. The cross members 15 are of considerable depth providing a correspondingly deep chamber, and the plate, being integral with the cross members 15 and side members 7, provides a spring seat fixed in position. The seat is provided with circular ring bosses 19 serving as spring retainers holding the springs (presently to be described), at their bottoms, against lateral displacement.

The lateral motion resistance and centering device comprises spring means. Various types of springs may be employed. In the present instance coil springs 20, preferably under relatively small initial compression, are employed. There are eight of these springs which are housed in the chamber 17 and are supported on the seat 16, one seated within each of the ring bosses 19.

A spring plate 21 is supported upon the springs freely between the cross members 15 and four lugs 22 extending inwardly from the cross members 15, one at each corner portion of the plate. The cross members 15 and lugs 22 provide guides for the plate in its up and down movement as will presently appear.

The plate 21 is best seen in Figs. 5 and 6. Around the upper end of each spring to retain it from lateral movement is a circular ring boss 23 which is formed on the lower face of the plate 21 and which is opposite and similar to a corresponding boss 19 on the seat 16. There are four springs at each side of the chamber and arranged two at each corner so that the plate 21 will be uniformly supported.

While the device is adapted for various types of lateral motion resistance and centering members, the type employed in the present instance is that commonly termed a rocker. The rocker has the characteristic of rocking or turning in opposite directions during its operation, but various other types, involving this characteristic of turning in opposite directions, may be employed. There is a rocker 24 at each side of the longitudinal center line of the truck and as they are similar a description of one will suffice.

The rocker is best shown in Fig. 7. The rocker is an integral structure comprising two similar rocker elements 25 connected by a hollow bar 26 triangular in cross section. Centrally disposed on this bar is an upstanding arm 27. Each element at its lower side has a pair of legs 28 having cylindrically shaped bearing faces 29 having an axis $a$, and 29' having an axis $b$. The legs are equally spaced from opposite sides of the vertical transverse central plane of the element. The other two sides of the element are cylindrically-shaped providing curved faces 30 and 30' which unite in the aforesaid vertical plane, the union being indicated at $c$, the face 30 having its axis at $a$, and the face 30' having its axis at $b$.

A rocker is disposed over and symmetrically with each of the groups of four springs at the respective sides of the longitudinal vertical central plane of the truck. The plate 21 is provided on its upper face with eight cylindrically-shaped sockets serving as seats 31, one for each of the legs 28, and being of a curvature substantially similar to the curvature of the faces 29—29'. The rockers are supported by the plate with their legs in these seats.

The center plate 3 is best shown in Fig. 8. It is of integral formation and comprises a plate member 32. The plate member at its bottom face is provided with cams 33, one opposite each of the faces 30 and 30' of each element 25, having inclined faces 34 directed upwardly and inwardly and meeting opposite the union $c$ of the corresponding faces 30—30' in the position the union $c$ assumes when the element is in normal centralized position, as shown in Fig. 3. These faces 34 provide seats for the faces 30—30' to roll upon when the element rocks or turns.

The plate member 32 is further provided at its bottom face with lugs 35, one for each of the arms 27. Each lug is spaced inwardly from and in transverse alignment with its corresponding arm 27 and is connected thereto by a pair of links 36 pivoted at their ends to the lug and arm, one at each side thereof. The links insure positive rocking or turning of the rocker 24.

The plate member 32 has opposite marginal portions 37 which extend transversely of the truck, resting upon the top faces of the cross members 15 for supporting the center plate and consequently the superstructure through the center pin 2. Inwardly of the marginal portions the center plate 3 is provided with opposite walls 38 depending from the plate member 32, one adjacent each of the inner faces of the cross members 15 and in sliding engagement therewith, permitting lateral movement between the center plate and truck. The truck, adjacent each of the marginal portions 37, is provided with a rib 39 upon which is bolted a plate 40 which overlaps the adjacent marginal portion 37, plates 40 holding the center plate and truck together but permitting the aforesaid relative sliding movements.

The center plate is further provided with opposite walls 41 depending from the plate member 32 and extending longitudinally of the truck connecting the walls 38. Outwardly beyond the walls 41 the truck is provided with longitudinally extending walls 42 formed integral with the side members 7 and connecting the cross members 15. They provide stop abutments for the walls 41 limiting the relative lateral movement between the center plate (superstructure) and truck.

The center pin 2 is of usual construction comprising a cylindrical pin 43 having a circumferential flange 44 which is secured to the underframe 1 in the usual manner (not shown).

The center plate is provided with a centrally disposed flange 45 providing a circular socket in which the pin 43 extends, the pin seating upon the plate member 32 for support thereby, the superstructure thus being supported on the center plate.

The center pin and center plate are provided with aligned orifices through which the bolt 4 passes, the pin having a hollow portion 46 in which the bolt head is disposed. A slot 47 is formed in the bottom wall of the bolster and extends in a direction transversely of the truck. The bolt 4 extends through this slot and has a nut 48 secured thereon spaced somewhat below the slot and overriding the bolster bottom wall at each side of the slot, the width of the slot being substantially equal to the diameter of the bolt, the bolt being for holding the truck to the superstructure, allowing however slight vertical play, all in the usual manner.

Fig. 3 shows the various parts in their normal positions, the center plate and bolster being in their normal centralized position as when travelling on tangent track. When entering, travelling through, or leaving curved track relative movement takes place. When relative movement from centralized position takes place between the center plate and truck, as for instance when the center plate moves toward the left (Fig. 3), the face 30 rolls upon the corresponding face 34, the bearing face 29 acts as a pivot and the bearing face 29' lifts from its seat 31. All of the rocker elements 25 operate simultaneously in a similar manner, which results in compressing or energizing the springs 20 with a consequent corresponding resistance to such movement, the compression and resistance increasing as the lateral movement increases in extent.

When the center plate is returning to the centralized position the rocker elements are returning to their normal positions and the springs are becoming deenergized, thereby assisting in the return movement to centralized position, the springs offering less resistance as their deenergization proceeds. Therefore in the normal position of the parts as shown in Fig 3 the springs offer relatively slight resistance. This assists in maintaining the center plate (superstructure) and truck in their normal centralized position when travelling on tangent track, but facilitating easy riding.

Fig. 4 shows the position of the parts at extreme relative lateral movement during the aforesaid operation from centralized position, this movement being terminated upon the wall 41 at the left coming into engagement with the corresponding wall 42 as shown.

In an obvious manner the device operates similarly when the lateral movement of the center plate from centralized and to centralized position are in the opposite directions except of course here it is the engagement of the faces 30' with their corresponding faces 34, and the turning is about the faces 29', the faces 29 lifting from their seats 31.

It will be noted that there is sliding engagement between the marginal portions 37 of the center plate and truck bolster cross members 15 during relative lateral movement. While the springs 20 are compressed during these movements, they exert an upward pressure on the center plate which operates to place some of the weight of the superstructure upon the springs and correspondingly relieves this portion of the weight of the superstructure from support by the cross members 15, thus facilitating the sliding movement by reducing the friction between the portions 37 and the cross members 15.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claim are contemplated as a part of this invention.

The invention claimed and desired to be secured by Letters Patent is:

In a railway vehicle, the combination of a multiple axle truck having a frame; a superstructure underframe; a structure supporting said underframe including a center pin member and a center plate member disposed one above the other, the upper of said members being rigid with said underframe and the lower of said members having an integral rigid plate seating on a rigid portion of said truck frame for support thereby and for frictional slidable lateral relative movement therebetween; and a device disposed beneath said structure comprising a bottom spring plate rigid with said truck frame, a top spring plate vertically movable relative to said truck frame, vertically disposed coil compression springs seating on said bottom plate and supporting said top plate at the corner portions thereof and lateral motion resistance and centering elements turnable in transverse vertical planes and operatively supported on said top plate above said springs symmetrically about the axis of said structure and operatively engaging said structure integral plate from beneath for coaction therewith for compression and release of said springs during said relative lateral movements respectively from and to central position to resist and assist said movements respectively while simultaneously exerting a substantial lifting force on said structure integral plate reducing the friction to prevent scoring of said truck frame during said slidable relative movement.

ALFRED W. BRUCE.